INVENTOR.
ROBERT E. BELL

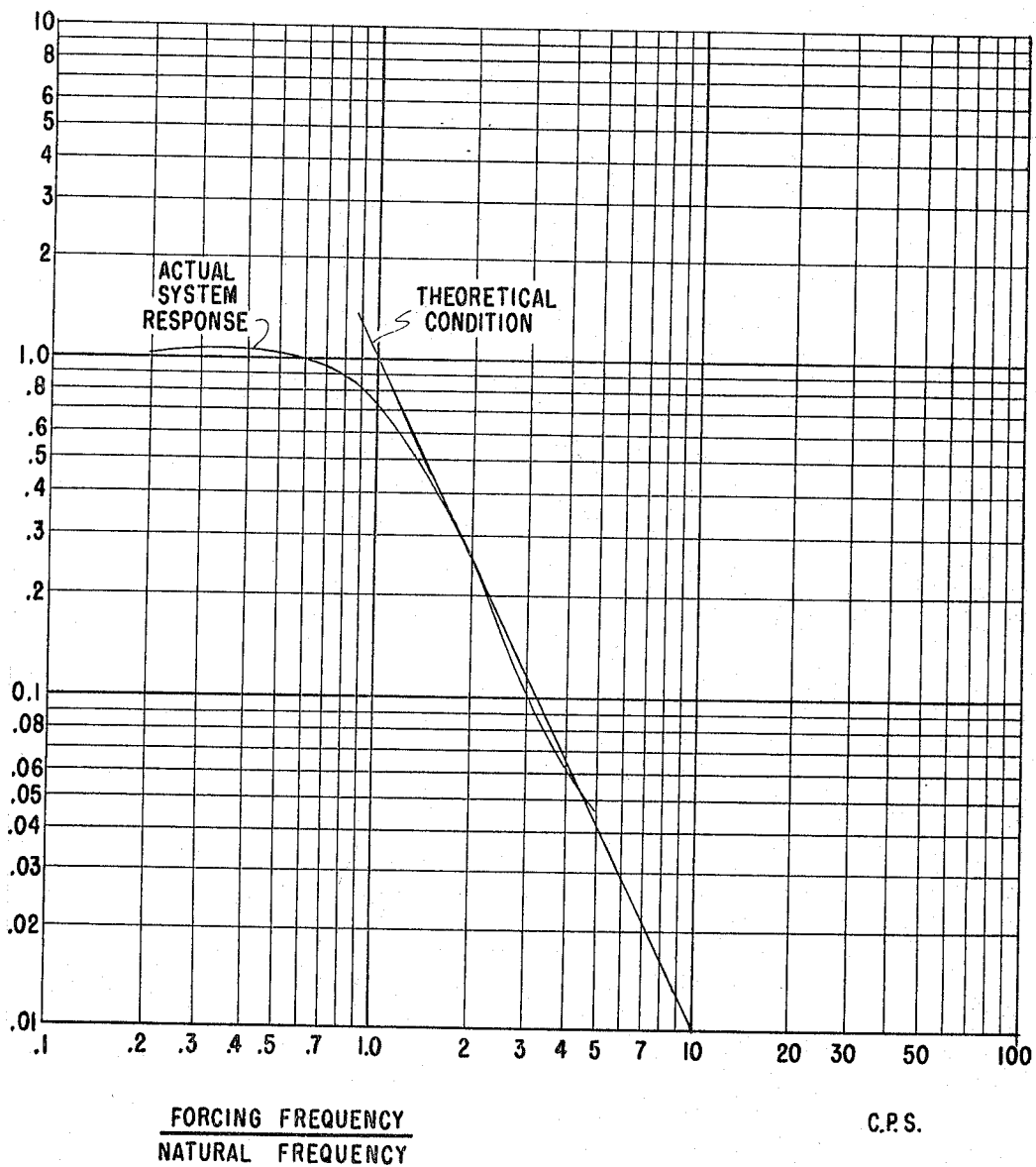

United States Patent Office 3,269,472
Patented August 30, 1966

3,269,472
VIBRATION ISOLATION MECHANISM FOR
ELECTRICAL WEIGHING SCALE
Robert E. Bell, Toledo, Ohio, assignor to Toledo Scale
Corporation, Toledo, Ohio, a corporation of Ohio
Filed Sept. 16, 1963, Ser. No. 309,000
7 Claims. (Cl. 177—188)

This invention relates to measuring devices and more particularly to vibration isolation mechanism to be used therewith.

Scales which employ load cells as counterforce or load responsive mechanisms are particularly susceptible to vibrations which are established in the load supporting lever system at the platform of a weighing scale. This susceptibility results in a high degree of flutter or jitter in the output of a load cell. The vibrations which are established in the supporting lever system may be due to the careless dropping of a load which is to be weighed upon the platform, or to the sudden application of a load to the scale platform. A constant vibration may also be established in the load supporting lever system by engine vibrations of a truck which has assumed a weighing position upon the platform. Further, the vibrations may be due to surrounding scale installation conditions. The type of surrounding conditions to which I have reference are vibrations established in the floor or beam structure due to the constant vibrations of factory machinery in the factory in which the truck platform is located, or they may be due to the particular location of the truck scale. For example, a truck scale may be set up near a railroad line and in this way a steady vibration through the earth will be transmitted to the lever system from the railroad activity nearby. Accordingly, it can be seen that the load cell counterforce mechanism may be influenced by at least three things: namely, shock due to the dropping or placing of the load upon the scale; a forcing vibration due to the surrounding conditions such as repetitive disturbances from railroad cars, running of nearby machinery, vibrations from motors running nearby; and a resulting vibration of the lever system at its natural frequency immediately after the levers experience a shock due to the dropping of a load thereupon.

Various schemes have been resorted to in an attempt to isolate the counterforce mechanism from the above-mentioned vibrations. However, all of these attempts have failed. A common attempt to solve the problem of shock vibrations in the load supporting levers due to the placing of a load upon the scale platform has been to place a dashpot or some other type of damping means on the tare beam lever, but whereas this may be effective to damp out the shock vibrations in a system which employs a usual spring or pendulum type of counterbalance it is not effective where the load responsive mechanism employed is a load cell. This is because of the fact that the deflection which a load cell experiences between an unloaded and a fully loaded condition is too small to permit the effective use of a dashpot. Also, in spite of all the efforts to damp out the shock effects by use of a dashpot the prior art weighing systems would still be susceptible to the forcing frequencies and accordingly a certain dial jitter is present.

The main reason for the failure in the prior art attempts was due to the failure of others to understand or appreciate the problem involved. Specifically, most of the prior art systems have failed to appreciate that in order to accomplish a lowering of the transmissibility of the magnitude of the disturbance established in the lever system by the factors detailed above to the load cell counterforce mechanism, that the weighing system must have a low natural frequency in comparison to the frequency of the disturbances. Further, even if the need of a weighing system to have a low natural frequency was appreciated no practical or working arrangements which are effective to reduce the weighing systems natural frequency to the desired low value have heretofore been developed.

Heretofore the use of a load cell as a counterforce device in a weighing system has not proved entirely effective. The main drawback has been the peculiar ability of the load cell to respond to high frequency forcing vibrations and shock. As a consequence of a load cell's ability to respond to high frequency vibrations or shock the output thereof will indicate a certain amount of jitter or flutter, and of course, this in turn will be transmitted by way of a servo balancing system to the relatively movable indicating arm which cooperates with an output chart. The prior art has failed to realize and/or cope with the fact that the high spring rate of a load cell results in a high natural frequency of vibration for a weighing system in which a load cell is utilized as the counterforce, and accordingly makes the load cell particularly susceptible to the high frequency disturbances outlined hereinbefore.

Furthermore, because of the small deflection, as small as .005″, of a load cell between its no load and full load limits, it has been found that a conventional dashpot is ineffective to damp out any shock vibrations transmitted to the load cell input by the load supporting lever system of the weighing scale. The ineffectiveness of a dashpot to damp out movements in the order of several thousandths of an inch in the connecting lever system is better appreciated when it is recalled that a dashpot is most effective to damp out high frequency or high velocity forces experienced in the lever system to which it is coupled, and is relatively ineffective to damp out low velocity forces. Accordingly, it is an object of this invention to eliminate the dial jitter due to forcing vibrations and shock excitation of the lever supporting system in a measuring system.

It is a further object of this invention to permit the effective use of a conventional damping means with a load cell counterforce mechanism to isolate the load cell from shock excitations established at the platform of a conventional weighing scale.

It is still another object of this invention to permit the use of a load cell as a load responsive mechanism by providing an effective mechanical filter to isolate the load cell from forcing frequencies established in a weighing scale by surrounding vibrations and permit only the desired load indicating forces to be transmitted thereto.

It is another object of this invention to provide a simple and inexpensive shock absorbing mechanism.

Still another object is the provision of a scale in which the counterforce mechanism is protected against shock.

It is a further object of this invention to permit a readout of a weighing scale which employs a load cell as the counterforce mechanism within a very short time after the application of a load thereto.

It is still another object of this invention to effectively utilize a load cell as a counterforce mechanism in a system which is under the influence of a substantial amount of vibrations.

It is still another object of this invention to obtain a jitter-free output from a load cell which is used as a counterforce in a weighing scale.

It is another object of this invention to provide a mechanism for achieving a quick and easy adjustment of the weighing system's natural frequency to be compatible and optimized with respect to the response time and attenuation characteristics of an associated servo driven output indicating device.

It is still another object of this invention to provide a mechanical filter which supplies an increased lever multiple in addition to that provided by a conventional load supporting system and thereby permits the use of a lower capacity load responsive device, and a resulting low system frequency without large lever deflection.

It is another object of this invention to provide a mechanism for adusting the natural frequency of a weighing system to the desired low value and also concurrently providing a counterbalancing force for the weighing system's dead load.

Other objects and advantages of the invention will appear from the following description, in which reference is made to the accompanying drawings illustrating a preferred embodiment of my invention and wherein similar reference numerals designate similar parts throughout the several views.

In the drawings:

FIGURE 3 is a graph relating the amount of forcing frequencies which will be experienced by a load responsive device for given ratios of forcing frequency to natural frequency.

Figure 1:
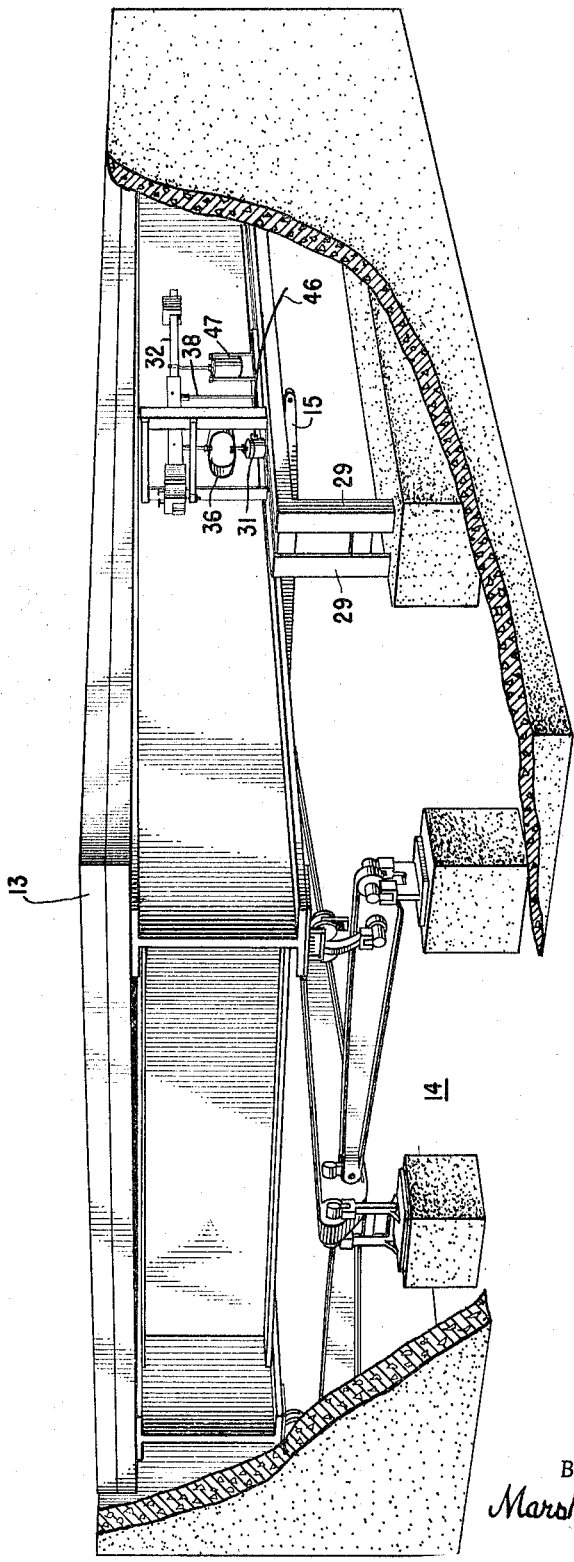
FIGURE 1 is a perspective view of a motor truck scale and illustrating the cooperation between platform and load supporting levers thereof and the vibration isolation device.

In accordance with the above and first briefly described there is provided a vibration isolation device for use with a platform type load cell scale which incorporates means for obtaining a substantially vibration free output from the load supporting lever system of a platform type scale. The vibration isolation device comprises a pivotally mounted lever and means for connecting the output of the load supporting lever system to the pivotally mounted lever. There is also provided a spring of substantially high elastic characteristics which has one end thereof connected in series with the load responsive mechanism and which has its other end connected to the pivotally mounted lever. In addition there are also provided adjustably positionable weights which can effectively tune the mechanism for a desired optimum natural frequency and also counterbalance the system's dead weight. There may also be provided a dashpot which is also effectively connected to the pivotally mounted lever to damp out any shock excitations experienced at the scale platform and accordingly prevent them from influencing the output from said load responsive device.

It is well-known that all lever systems have a natural frequency of vibrations, and this natural frequency is predictable by use of the formula:

$$f = 3.16 \, (\sqrt{K/W})$$

wherein K is equal to the stiffness of the system and W represents the weight of the system as reflected to the same point of the system at which the spring is located. From this formula, without burdening the reader with the mathematics, it can be appreciated that if the output lever 15 of the truck platform scale, see FIG. 1, were connected directly to the input of a load cell, such as 31 of FIG. 2, that the natural frequency of the system would be very high. That this is true is obvious from the fact that the K would be the spring rate of a load cell which is very high, a typical figure being a full load deflection of .005″, and there is virtually little weight in the system, when reflected to a point in the system at which the load cell is located.

FIGURE 3 is a logarithmic graph of the transmissibility versus the $$\frac{\text{forcing frequency}}{\text{natural frequency}}$$

of my system, and from this it is seen that for high ratios of $$\frac{\text{forcing frequencies}}{\text{natural frequencies}}$$

that very little of the magnitude of the lever system's forcing frequency will be transmitted to the counterbalancing load cell. Specifically, by forcing frequencies I am talking about a disturbance whose magnitude varies between maximum and minimum values, and may even change directions. The forcing frequency can be defined in terms of a sine function by the formula:

$$\text{forcing frequency} = F \sin \omega t$$

In this sine definition of the forcing frequency F is the magnitude of the forcing vibration and $\omega t$ is its frequency. For example, if the ratio is 10 only .01% of the magnitude will affect or reach the load cell. Whereas if the ratio is low a high percentage of the forcing frequency will be effective on the load cell output. In practice, it has been found that a forcing frequency due to the surrounding scale activity of about 10 cycles per second is not unusual. Therefore, as explained above, without any damping or vibration isolation the system's natural frequency will be high and the ratio of $$\frac{\text{forcing frequency}}{\text{natural frequency}}$$

will be low. Accordingly, a high transmissibility factor for this system will be present.

In addition to the problems outlined above, in a system wherein the output lever, 32, is directly connected to a load cell type counterforce element, there are numerous other problems also encountered. One of the main disadvantages of the prior art systems, and accordingly a prime objective of this invention, is the inability of commercially available dashpots to provide sufficient shock absorption. This point perhaps may be brought out best by partially going through some of the equations which can be written for a vibrating system such as ours. First we can write the differential equation:

(1) $$M\frac{d^2x}{dt^2} + D\frac{dx}{dt} + KX = 0$$

where M is equal to system mass, D is equal to the damping factor, and K is equal to the system stiffness. Equation 1 can then be solved for critical damping conditions and the following equation obtained:

(2) $$\frac{D^2}{M^2} = \frac{4K}{M}$$

Solving Equation 2 for damping factor D we obtain:

(3) $$D = 2\sqrt{KM}$$

Also, recalling that the system's natural frequency omega is defined by the equation:

(4) $$\omega = \sqrt{K/M}$$

we can now solve for the damping factor D in terms of K, $\omega$, and M, and obtain:

(5) $$D = \frac{2K}{\omega}$$

and (6) $$D = 2\omega M$$

Now since it is desirable to obtain a low system transmissibility factor, which means that it is desirable for the system's natural frequency to be as low as possible, it is clear that one way to achieve this is by adding a great deal of mass into the system, see Equation 4 above. However the result of adding a substantial amount of mass into the system is evident from a look at Equation 6, which reveals that the system's damping requirements increase in proportion thereto. Accordingly, it is evident that the means providing the system damping must be large, and this is one reason why the present commercially available dashpots have proved to be inadequate in prior art systems.

Furthermore, the inadequacy of commercially available dashpots in prior art load cell weighing systems can also be explained from a look at Equation 5. From Equation 5 it can be seen that if $\omega$ is made low in order to provide good system vibration filtering, while at the same time K is high, since we are using a load cell as a counterforce element, that the system damping requirements, which must be provided by a dashpot, must be very large.

At this point it should also be mentioned that the choice of location of the dashpot in the system also plays an important role in the isolation of the counterforce element from the system's vibration. For in all prior art systems the dashpots have customarily been positioned between the output lever and the load cell counterforce element. From this location it is evident that any vibrations experienced by the lever will be transferred to the load cell by way of the dashpot. Accordingly a considerable amount of indicator jitter or flutter has been present in the prior art systems. However, in my system the dashpot, 47, is connected to ground in parallel with load cell 31, and accordingly load cell 31 will be substantially uninfluenced by vibration experienced in lever 3, or vibrations which are transmitted by way of ground to the dashpot.

From the above it should be appreciated that the effective way of combating the inherent and unwanted forcing vibrations, and to prevent transmission of the same to the load responsive device is to reduce the natural frequency of the scale lever system. Also, the way to reduce the effects of shock excitation on the load cell is to vary the system's mass, stiffness factor, and natural frequency without resulting in an unobtainably high system damping factor. By reducing the natural frequency of the system to an optimum low value, which value is arrived at by considering all of the system's factors, the ratio of $$\frac{\text{forcing frequency}}{\text{natural frequency}}$$

will approach ten cycles per second, assuming a forcing frequency of ten cycles per second. A look at the graph of FIG. 3 indicates that as the above ratio approaches ten the transmissability factor will approach .01 percent.

Figure 2:
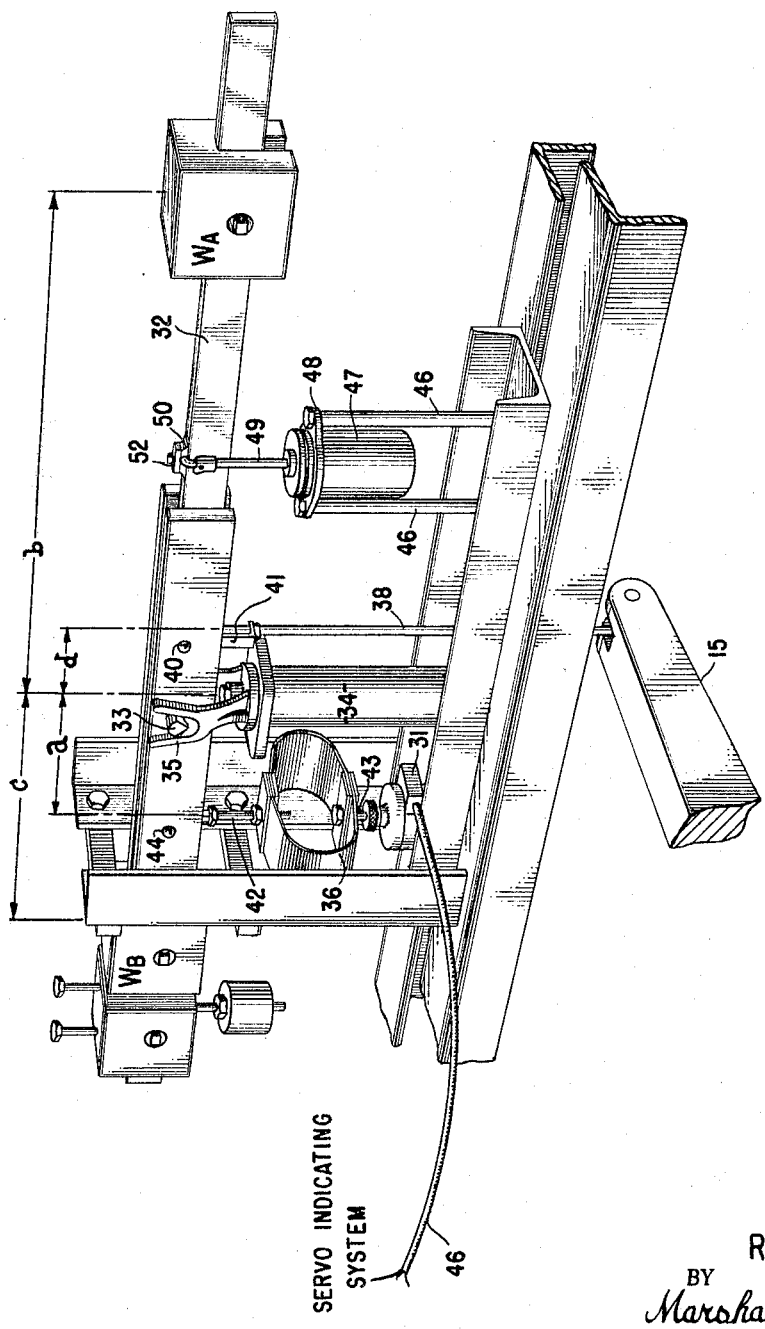
FIGURE 2 is a detailed illustration of the relationship of the elements which make up my unique vibration isolation mechanism.

The manner in which the natural frequency of a weighing system which employs a load cell as its load responsive mechanism has been reduced from its previously high value will now be explained in detail. A look at the hereinbefore mentioned Equation 4 indicates that the manner in which a system's natural frequency can be reduced is by reducing the system effective spring rate, K, or by increasing the system's effective weight, or by doing both. Accordingly, I have provided a lever 32 which is fulcrumed at a point, 33, intermediate its ends. There is also provided a post 34 to furnish subadjacent support to the pivot housing 35. In the above manner the lever is divided into two ratio arms, one on either side of the fulcrum. Further, as shown in FIG. 2, a steel yard rod 38 is provided. Steel yard rod 38 has its lower end connected to the transverse lever 15 of a conventional seven lever motor truck or cattle scale, indicated by the numeral 14 at FIG. 1. There is also provided, as shown in FIG. 1, the usual load receiving platform 13 which is supported by the load supporting levers 14. It should, of course, be appreciated that any type of weighing scale can be used.

The other end of rod 38 is suspended to the laterally extending pivot 40, in the lever 32, by way of the strap and bearing connection 41. The steel yard rod 38 is shown in FIG. 1 to be extended in an upwardly direction, and accordingly the frame supporting structure 29, see FIG. 2, will be adjacent to the steel yard rod 38 and of a proper height to permit a vertical connection between rod 38 and the vibration isolation lever 32. Whether or not the frame 29 extends above the platform 13 of FIG. 1 or is totally enclosed thereunder is a matter of design and either may be used.

The weight and spring which is to be inserted into the system in order to increase the displacement of piston stem 49 to a figure which makes the use of a dashpot an effective tool in overcoming the shock excitations experienced by the lever system and to reduce the natural frequency of the system, from the normally high value which exists when the load responsive mechanism is connected directly to the steel yard rod 38, to the desired low value can be inserted at various points of the system.

A very compact and workable isolation system was found to exist if an arrangement as shown in FIG. 2, the preferred embodiment of my invention, is resorted to. However, it should be noted that if the only object of the added weight is to counter-balance the system's dead weight then it may be that only a single weight would be necessary. Also it may turn out that the single weight may, when reflected to the same point of the system to which spring 3 is connected, provide an adequate W effective to satisfy the requirements of the system, as defined by the hereinbefore mentioned equation, and result in the desired low natural system frequency. However, if a single weight is not workable to achieve both of these necessary conditions then a pair of weights may be resorted to, and these weights can then be selectively positioned to provide the desired inertial and counterbalancing features. Also, as shown in FIG. 2, by placing the weights on opposite sides of the fulcrum the sizes thereof may be made to be of reasonable small value. Since, it will be recalled, that I am concerned with the effect of the added weights as seen at the same point in the system to which the spring 36 will be connected, it follows that the effect of these weights when positioned on the lever arms is greatly enhanced. Stated another way, ($W_{\text{effective}}$) is reducible by the ratio of the square of the distance of the weight as located on the lever arm from the fulcrum thereof over the square of the distance of the load cell from the fulcrum point. In other words:

$W_{\text{effective}}$ of weight $A = W_A (b^2/a^2)$
$W_{\text{effective}}$ of weight $B = W_B (c_2/a_2)$ wherein the letters are as defined in FIG. 2. Also the total effective weight is the sum of the effective weights of A and B.

In addition to the reduction in weight possible if an arrangement such as FIG. 2 is resorted to there is an added advantage of being able to use a relatively small size spring 36. As seen in FIG. 2, spring 36 may be made of two U-shaped sections which have been joined together at their sides to form a closed oblate-shaped loop. The material used is a matter of design the only criteria being that it be of comparatively good elastic material. Projecting from the spring 36 are two studs 42 and 43. Stud 42 is connected to a lateral projection from lever arm 32 at point 44 in any of the many conventional ways. It should be observed that the two weights $W_A$ and $W_B$, fulcrum 33, pivot 40, and the lateral projection at point 44, all lie in the same horizontal plane thus resulting in added sensitivity and accuracy. Stud 43 is connected to the load receiving surface of load cell 31 to thereby transmit any movement which the lever 32 experiences due to a movement by rod 38 to the load cell 31 by way of the spring 36.

Load cell 31 provides the load responsive mechanism in my weighing system. Cell 31 is of conventional design and its capacity may be varied in accordance with the load to be measured. Moreover, by the use of the lever 32 in addition to the customary platform supporting and output levers, indicated generally by the numeral 14 of FIG. 1, there results an increase in the overall multiple between the point of load application and the position of load responsive device 31. This increase of multiple, of course, results in a reduction in the proportion of the applied load as reflected at the load responsive device. Accordingly, whereas prior systems, wherein the output lever was directly connected to the load cell, required a load responsive device of say 1000 pounds capacity, I am, through the use of my increased multiple ratio, able to utilize a load responsive device of only 100 pounds capacity. Further, as explained above, since the system's natural frequency may be reduced by either decreasing the system's effective stiffness factor (K effective) or by increasing its effective weight (W effective), it follows that if a soft spring 36, one having for example one inch deflection for 100 pounds of load applied thereto, was placed between the lever 32 and the load responsive device 31, in order to reduce the system's K factor that it would experience a ten inch travel in the case of a 1000 pound load cell, whereas it would only experience a one inch deflection when a 100 pound load cell is utilized. It hardly requires mention that a weighing system's accuracy and sensitivity, among other things, cannot tolerate a ten inch deflection in the lever system which connects the load application point to the load sensing point. Also, whereas it is recognized that a 1000 pound per inch spring could have been used instead of a 100 pound per inch spring and therefore restrain the spring and lever deflection to a reasonable one inch even where a 1000 pound load cell is employed, it also would follow in that case that the weight (W effective) would then have to be increased by a factor of ten to obtain the desired low natural frequency for the system. It is therefore obvious, that considerable advantage is gained by resorting to an increase multiple ratio which is achieved through my unique arrangement.

Although it should be appreciated that I could have employed any of the many well-known load indicating devices, such as digital counters for example, I instead chose to utilize a servo driven readout system. For a more detailed explanation of a load responsive device which utilizes a servo driven readout scheme the reader is referred to Patent 2,944,808, of common ownership herewith. For this disclosure let it suffice to say that our servo driving system can be arranged to result in the driving of a differentially positionable indicator relative to a graduated load indicating stationary chart from a zero load indicating position to a full load indicating position in either 2, 8, or 20 seconds. Having once established the time that will be required for the servomotor to drive the chart indicator from a zero to full load indication, in response to the application of a load upon platform 13, the system's natural frequency of oscillation can then be arrived at. The system's natural frequency is a compromise between:

(1) as fast an indication of the load at the load indicating device as the servo system is capable of indicating, and
(2) the ability of the servo system to attenuate the undesirable high frequencies which pass through the load responsive device, and which may result in undesirable indicator jitter.

The greatest attenuation by the servo system of undesirable high frequencies from influencing the indicator results when the weighing system's natural frequency is as high as tolerable, on the other hand the best response time of the servo system to sense and register the generation of a load signal from the load responsive device 31 occurs when the natural frequency of the system is as low as possible, down to a fraction of a cycle. Accordingly, as a compromise between the two factors, I have found that by setting the natural frequency of the system to one cycle per second that I obtain a substantially jitter-free indication without any sacrifice in speed of indication by my servo system.

Therefore, in practice cord 46 will be connected across the output terminals of the load cell's associated strain gage, not shown. In turn, a voltage will be developed which is indicative of the deflection which the load cell experiences and the voltage will then be used to control the servomotor, not shown. The servomotor's output is then effective to control the position of an indicating pointer relative to a stationary graduated chart. In this manner, the weight of the load applied to platform 13 of FIG. 1 may be accurately determined.

In the above manner, a natural frequency of the system of one cycle per second can be obtained by the use of inertial weights totaling approximately one hundred pounds and a spring which has a spring rate of approximately 100 pounds per inch. The use of the above elements will permit a lever arm deflection of approximately one inch for a deflection of the load cell from a no load to a full load position. With the resulting increase in deflection of lever arm 32 from the small value of roughly .005" when spring 36 was not in the system to approximately one inch after spring 36 has been placed in series with load cell 31, it is now possible to effectively utilize a dashpot 47 of conventional design and size to prevent any continual oscillations of lever 32 due to shock excitation thereof by load applications to platform 13 of FIGURE 1. As shown in FIG. 2, dashpot 47 is removably secured in a vertical position to mounting frame 29 by way of bracket 48 and rods 46. Dashpot 47 comprises an outer cup-shaped, liquid filled cylinder into which is placed a loosely fitted plunger or piston, of which only the shaft 49 is shown to be removably secured to the upper edge of lever 32 by means of screw 52. Because of increased deflections in lever 32, after the incorporation of my unique vibration isolation mechanism, from .005" to approximately one inch, dashpot 47 can be of conventional size. Also because of the increase in deflection of lever arm 32 dashpot 47 is now effective to damp out any shock excitation established in the system's load supporting levers, 14, by the sudden application of a load to the platform 13.

That is, the increase in deflection of the lever 32 results in an increase in velocity of the shock vibrations transmitted thereto by way of the platform supporting lever system, and accordingly as the velocity of the forces transmitted to a dashpot piston are increased the damping efficiency of the dashpot will also increase. Therefore a conventional dashpot will then be capable of shunting the shock effects to ground and thereby prevent them from affecting the output of load responsive device 31.

It should be here mentioned that in practice it is unnecessary to calculate the values of weights A and B and the spring rate of spring 36 in order to determine the necessary values thereof to establish a natural system frequency of one cycle per second, for all that is necessary is to vary the relative positions of weights A and B in relation to the fulcrum 33 of lever 32 until a lever oscillation of approximately one cycle per second is observed. This obviously results in a very flexible vibration isolation system which can be easily adapted to any desired system natural frequency rate.

Furthermore, it should also be mentioned that by this unique arrangement it is possible to balance off any undesirable large loading on the load cell due to the platform and supporting lever weight by merely positioning the weights A and B until the desired amount of preloading has been established. It is, of course, possible to counterbalance all of the undesired dead load, however it has been found advantageous to permit a small preloading, up to 10 percent of the load cell range, to insure a positive seating of all of the levers and to take up any slack in the lever connections. In this manner only a small fraction of the load cells capacity will have been used up by the dead weight, and as well the system will be primed to yield an immediate effect at the load cell counterbalancing mechanism in repsonse to the application at platform 13.

In the above manner it can be seen that it is possible to vary the position of weights $W_A$ and $W_B$ until the natural frequency of the system has been reduced to approximately one cycle per second. Accordingly, the forcing frequency, attributable to the conditions surrounding the scale installation, truck motor vibrations, etc., will not be transmitted to the load cell and thereby result in a jitter or fluctuation of the dial indicating arm, instead as a look at the transmissibility curve of FIG. 3 will indicate, only as low as about .01 percent of the magnitude of the forcing frequency will actually affect the load cell output. In addition because of the increased deflection on the fulcrumed lever, any vibration established in the system by the shock excitation of the load supporting levers can be effectively damped out by the conventional dashpot 47. Therefore, it is obvious that the combination of the members shown in FIG. 2 are particularly well-suited to absorb and damp out both undesirable shock excitations and forcing frequency established in the load supporting levers and thereby prevent the transmission thereof to the load cell counterbalancing mechanism 31. The result of course, will be a jitter-free, quick and accurate output at the load cell in response to the application of a load to platform 13.

While reference has been made hereinbefore to the use of my vibration isolation mechanism in a truck scale it should of course be appreciated that it has universal application, and accordingly is also well-suited for use with all scales which employ load cell counterbalancing mechanisms, such as cattle scales.

Further, while I have shown my vibration isolation mechanism to be used to damp out the disturbances experienced in a seven lever platform supporting system it should be appreciated that the load receiving element can be applied directly to steel yard rod 38 without employing any lever system at all.

It should be understood that various modifications may be made in specific details of construction without departing from the spirit and scope of my invention.

Having described the invention, I claim:

1. An electronic weighing scale comprising, in combination, a stationarily mounted dashpot, an output member, a load cell whose electrical output is indicative of load upon the scale having a relatively high spring rate and a full load deflection less than the movement required to drive the dashpot effectively, a lever connected to the output member, and resilient means having a relatively low spring rate connecting the lever to the load cell for increasing movement of the lever from said movement less than that required to drive the dashpot effectively to movement capable of driving the dashpot effectively, the dashpot being connected to the lever for shunting shock forces away from the load cell.

2. An electronic weighing scale according to claim 1 wherein said full load deflection is about 0.005 inch.

3. An electronic weighing scale according to claim 2 wherein said increased movement of the lever at said full load deflection is about one inch.

4. An electronic weighing scale comprising, in combination, an output member, a load cell whose electrical output is indicative of load upon the scale having a relatively high spring rate and thus a relatively high natural vibration frequency, a pivotably mounted lever connected to the output member, resilient means having a relatively low spring rate connecting the lever to the load cell, and adjustable weight means carried by the lever for assisting the resilient means reduce the natural vibration frequency of the scale to a relatively low frequency and for adjusting said relatively low natural vibration frequency to the optimum frequency.

5. An electronic weighing scale according to claim 4 wherein said optimum frequency is about one cycle per second.

6. An electronic weighing scale according to claim 4 wherein the adjustable weight means includes two weights, one on either side of the lever's pivot axis.

7. An electronic weighing scale according to claim 6 wherein the two weights and the lever's pivot axis all lie in the same plane.

References Cited by the Examiner

UNITED STATES PATENTS

| | | | |
|---|---|---|---|
| 1,654,648 | 1/1928 | Hem | 177—187 |
| 2,040,071 | 5/1936 | Brendel | 117—214 |
| 2,616,683 | 11/1952 | Le Fevre | 177—211 |
| 2,681,566 | 6/1954 | Ruge | 73—141 |
| 2,742,278 | 4/1956 | Carleton | 177—189 |
| 2,864,608 | 12/1958 | Reiser | 177—189 |
| 2,924,970 | 2/1960 | Samsel et al. | 73—141 |
| 3,084,541 | 4/1963 | Rogue | 73—141 |
| 3,091,303 | 5/1963 | Moses et al. | 177—208 |
| 3,096,652 | 7/1963 | Cornelison | 73—398 |
| 3,101,800 | 8/1963 | Raskin | 171—1 |
| 3,163,248 | 12/1964 | Farquhar | 177—188 X |

FOREIGN PATENTS

| | | |
|---|---|---|
| 820,502 | 11/1951 | Germany. |
| 702,891 | 1/1954 | Great Britain. |

LOUIS J. CAPOZI, *Primary Examiner.*

LEYLAND M. MARTIN, LEO SMILOW, *Examiners.*

G. J. PORTER, ROBERT S. WARD,
*Assistant Examiners.*